(No Model.)

S. S. COOK.
STEAM VALVE.

No. 361,990. Patented Apr. 26, 1887.

WITNESSES:
Th. Rolle.
A. P. Grant.

INVENTOR:
S. S. Cook
BY John A. Wiedersheim
ATTORNEY

UNITED STATES PATENT OFFICE.

STEPHEN S. COOK, OF PHILADELPHIA, PENNSYLVANIA, ASSIGNOR OF ONE-THIRD TO GEORGE W. VOGLER, OF SAME PLACE.

STEAM-VALVE.

SPECIFICATION forming part of Letters Patent No. 361,990, dated April 26, 1887.

Application filed November 11, 1886. Serial No. 218,541. (No model.)

*To all whom it may concern:*

Be it known that I, STEPHEN S. COOK, a citizen of the United States, residing in the city and county of Philadelphia, State of Pennsylvania, have invented a new and useful Improvement in Steam-Valves, which improvement is fully set forth in the following specification and accompanying drawings, in which—

Figure 1:
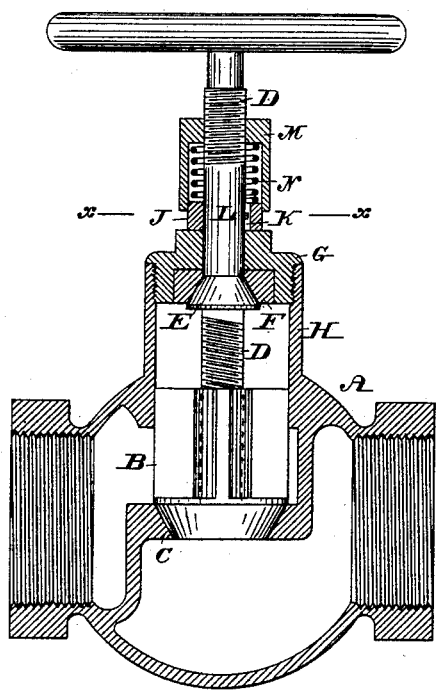
Figure 2:
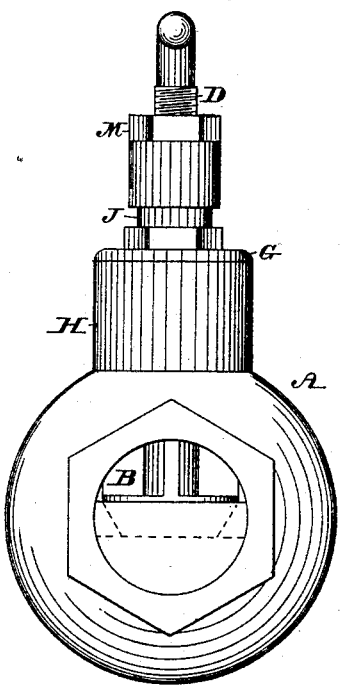
Figure 3:

Figure 1 represents a vertical section of a valve embodying my invention. Fig. 2 represents a side elevation thereof. Fig. 3 represents a horizontal section in line *x x*, Fig. 1.

Similar letters of reference indicate corresponding parts in the several figures.

My invention consists of a steam-valve having a valve on the stem thereof, and means, as hereinafter set forth, for holding the same on its seat, whereby leakage of steam around the stem is prevented.

Referring to the drawings, A represents the shell of a steam-valve; B, the valve proper; C, the valve-seat, and D the valve stem. Formed with or secured to the stem D is a valve, E, whose seat F is on the cap G, which latter is screwed or otherwise secured to the neck H of the shell A, said stem passing through said cap G and having an operating wheel or handle on its outer end.

Resting on the cap G is a collar, J, which encircles the valve-stem and has on its inner face a groove, K, in which is fitted a tongue, L, which projects laterally from the valve-stem, whereby said tongue may rise and fall in said groove and the collar rotate with the valve-stem.

M represents a chambered nut, which engages with threads on the valve-stem and bears against a spring, N, the latter encircling the stem and resting on the collar J, it being noticed that the spring presses against the nut in such manner as to force the valve E upwardly or outwardly, and thus toward its seat F.

The valve B is opened and closed by the action of the valve-stem, whose inner end is threaded and engages with a threaded opening in the center of said valve, so that by rotation of the stem the valve may be moved in opposite directions. When the valve is open, the spring N forces the valve E tightly on its seat, whereby leakage of steam at said valve, and consequently through the neck H, is prevented.

In closing the valve B, should it not be pressed tightly on its seat, whereby steam passes through said valve, the spring N will raise said valve from its seat and force the valve E tightly against its seat F, thus preventing leakage at the latter. The valve-stem is then rotated to further extent, whereby the valve B is fully closed and leakage due to back-pressure is prevented at both valves B and E.

Having thus described my invention, what I claim as new, and desire to secure by Letters Patent, is—

1. A valve-stem with a valve proper and an additional valve, the spring N, the chambered nut M, the collar J, and cap G, with seat F, combined and operating substantially as and for the purpose set forth.

2. The stem D, with valve E and tongue L, in combination with cap G, having seat F, the nut M, the spring N, and grooved collar J, all substantially as and for the purpose set forth.

3. A valve-stem with valve and tongue L, in combination with cap G, having seat F, the chambered nut M, the spring N in said nut, the collar J, having a vertical groove, and means, substantially as described, for rotating said stem, all substantially as and for the purpose set forth.

STEPHEN S. COOK.

Witnesses:
JOHN A. WIEDERSHEIM,
A. P. GRANT.